April 14, 1970 A. J. TELLER ET AL 3,505,788

GAS SCRUBBER APPARATUS AND PROCESS

Filed May 23, 1968

INVENTORS.
EDWARD SMITH WYATT
AARON J. TELLER

BY *McLean, Morton & Boustead*

ATTORNEYS.

United States Patent Office 3,505,788
Patented Apr. 14, 1970

3,505,788
GAS SCRUBBER APPARATUS AND PROCESS
Aaron J. Teller, Great Neck, N.Y., and Edward S. Wyatt, Lakeland, Fla., assignors to Wellman-Lord, Inc., a corporation of Florida
Filed May 23, 1968, Ser. No. 731,506
Int. Cl. B01d 47/06
U.S. Cl. 55—233                                9 Claims

ABSTRACT OF THE DISCLOSURE

An apparatus for and a process of recovering foreign materials from a carrier gas. The carrier gas and foreign material are introduced tangentially into an elongated vertical cylindrical recovery zone into which a washing liquid is radially sprayed. A major portion of the foreign material captured by the water spray is washed to the cylindrical sidewall by the spray. The resulting slurry or solution passes behind a barrier and is discharged from the recovery zone. The gas, with some entrained liquid and small foreign particles, passes through the barrier and flows into a packed bed, concurrently with a second washing liquid to further remove foreign material from the carrier gas. The bed is packed with a material having a substantially nonadhering surface and a high free volume. The liquid then leaves the recovery zone through one outlet, and the carrier gas leaves through another outlet which includes a second packed bed to remove entrained liquid.

The present invention pertains to a process of and an apparatus for recovery of foreign values, i.e., solid, liquid or gaseous foreign materials carried within a gas. More particularly, the present invention pertains to a process of and a system for the removal of gases and particulates from a carrier gas.

The product gases resulting from numerous chemical processes include contaminants which if released into the air would be detrimental to the health of persons breathing that air. Thus, for example, in the process of acidulation of phosphate rock by acids, a gas is generated which might contain silicone tetrafluoride, hydrogen fluoride, water vapor, dust and mists, as well as the carrier gas, air. The recovery of these fluorides is an important aspect of the control of air pollution. To avoid contaminating air it is desirable that this recovery be complete in excess of 99%. Likewise, a carrier gas might have within it a useful material, the recovery of which is desired as a source of that material.

Although the present invention is described with reference to, and is particularly advantageous for, the recovery of fluoride gases and particulates from air, it is also applicable to recovery of any foreign values, i.e., solid, liquid or gaseous material, from a carrier gas. The present invention is an improvement over known processes, for instance one in which foreign gases such as fluoride gases are recovered from a carrier gas such as air by passing the mixture through water. Such a prior art recovery process is not wholly satisfactory, because for example the absorption of silicon tetrafluoride by water is accompanied by the deposition of solids in the form of silicic acid in various degrees of hydration. These solids result in plugging of the recovery system.

The present invention is a process of and a system for the recovery of foreign values from a carrier gas in which operation is not inhibited by the deposition of solids. The system includes a cylindrical recovery zone into the top of which the gaseous mixture is introduced tangentially. The gaseous mixture is contacted by a radially directed spray of a washing liquid. The particular washing liquid utilized will depend upon the foreign values to be removed. Where fluorides are to be removed, the washing liquid might be water, recycled pond water or any solution of basic material such as sodium hydroxide or calcium hydroxide. In other services, the washing liquid might be an acid. The radially directed spray washes the gaseous mixture with a finer spray than can be utilized in apparatus having a wall spray. Thus a greater degree of gas absorption is achieved. The majority of the foreign material is recovered in this zone in which no plugging areas exist. The high velocity spiral motion of the gaseous mixture resulting from its tangential inlet causes centrifugation of the liquid spray and any resulting solid. Thus, these materials are spun outward toward the walls of the vessel from which they drain off behind a barrier. The remaining gas is relatively clean of foreign materials, but still contains some entrained liquid. This gas proceeds downward within the vessel, through a cocurrent spray of washing liquid such as water. The gas and washing liquid pass through a bed of packing material which removes substantially all of the remaining foreign material. The liquid then leaves the bottom of the vessel, and the gas leaves through a side outlet including a second packed section which further removes entrained liquid from the gas.

The present invention performs in a single piece of equipment the several functions which other systems have performed in separate pieces of equipment. Thus, in the apparatus of the present invention the foreign gases and particulates are washed from the carrier gas, and entrained liquids are removed from the carrier gas, all within one piece of equipment. This single shell system substantially reduces the complexity and cost of the apparatus.

These and other aspects and advantages of the present invention are apparent in the following detailed description and claims, particularly when considered in conjunction with the accompanying drawings in which like parts bear like reference numerals. In the drawings:

Figure 1:
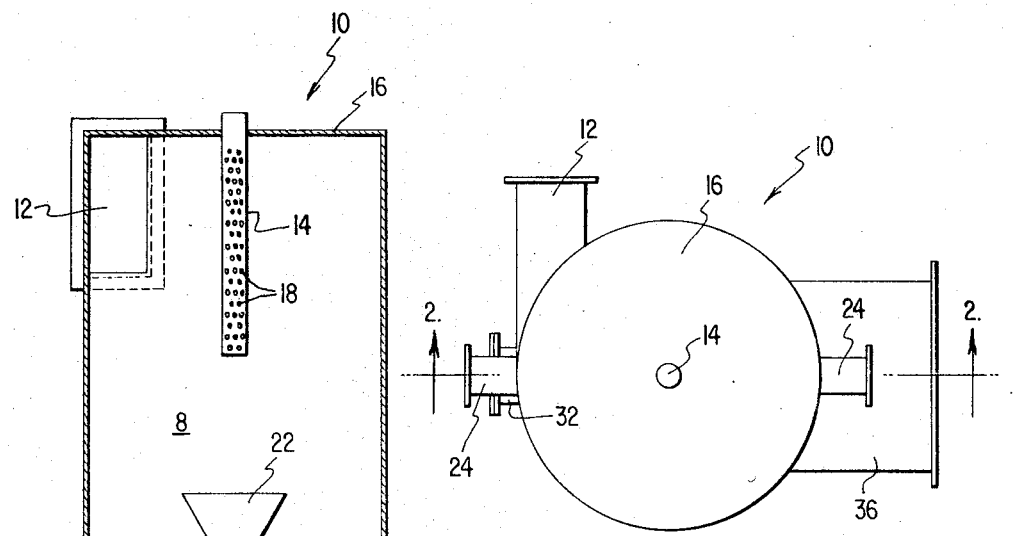
FIGURE 1 is a plan view of the apparatus of the present invention.
Figure 2:
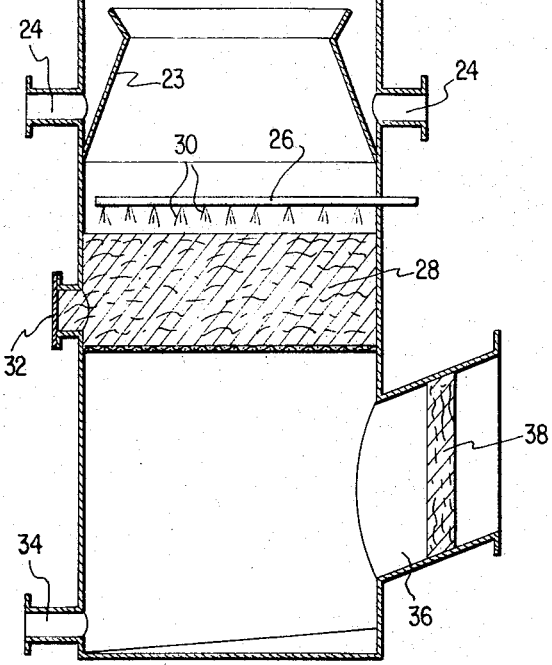
FIGURE 2 is a sectional elevational view of the apparatus taken along line 2—2 of FIGURE 1.

As seen in the figures, the gas containing foreign materials, for example air carrier gas with fluoride contaminants, enters recovery zone 8 within elongated, vertical, cylindrical vessel 10 tangentially through inlet 12 near the top of vessel 10. Pipe 14 extends vertically downward through the top 16 of vessel 10, a short distance into recovery zone 8. Exteriorally of vessel 10, pipe 14 is connected to a source of washing liquid such as water (not shown). Pipe 14 is closed at its lower end within zone 8 and includes a plurality of openings 18 along its length. As a result, the washing liquid within pipe 14 is directed radially outward in a spray. The gas enters recovery zone 8 from inlet 12 at a velocity high enough to result in a cyclonic action within recovery zone 8, e.g., in a ten-foot diameter recovery zone, a velocity in the range of about 2000 to 5000 feet per minute and preferably a velocity of about 3000 feet per minute. While velocities above 5000 feet per minute could be utilized, the increased pressure drop resulting from high velocities makes them uneconomical. The nozzle pressure of the liquid spraying from pipe 14 is great enough to cause the spray to reach cylindrical sidewall 20 of vessel 10, e.g., a pressure in the range of from about 10 to 500 p.s.i., preferably in excess of 40 p.s.i. The gas velocity and nozzle pressure are controlled for optimum operation of the apparatus and might vary with the carrier gas and foreign material encountered and the washing liquid utilized, as well as with the size of vessel 10 and the size of spray droplets emitted by pipe 14.

The gaseous mixture entering recovery zone 8 through inlet 12 is contacted by the radially directed spray from pipe 14. As a result a large portion of the foreign material within the carrier gas is removed. This removal, by way of examples, might be by absorption of foreign gas from the carrier gas or by capturing of foreign particulates by the washing liquid. Thus, a great proportion of the fluorides and most foreign particulates of a size above about three microns are removed by this spray. The radially directed spray and the cyclone action of the gas, created by its high velocity tangential inlet, cause centrifugation of the liquid spray droplets, the absorbed gases, the trapped foreign particles, and the solids formed. Consequently, these materials are spun outward toward cylindrical sidewall 20. To break the vortex flow of liquid within the recovery zone 8, which otherwise might result in liquid flowing directly downward in the center of vessel 10, an obstacle such as core buster 22 can be placed within the center of recovery zone 8, a distance below pipe 14.

The liquid slurry containing fluoride contaminants accumulates at sidewall 20 and is drained off behind barrier 23, passing out of vessel 10 through outlet pipes 24. Advantageously, this liquid can be treated for removal of fluorides, for example by passage to a settlement pond in which calcium ions cause precipitation of fluorides which then settle to the bottom of the pond, thereby substantially reducing the concentration of fluorides in the liquid. The liquid is then either discharged or recycled into the system. If the foreign material within the carrier gas is a desired end product, the liquid from vessel 10 can be recycled with little or no treatment to increase the concentration of that material within the resulting liquor. The remaining gas, which is relatively clean of foreign material but which still contains some entrained liquid and smaller foreign particles, proceeds downward through the central aperture of barrier 23.

Inlet pipe 26 extends horizontally into vessel 10 below barrier 23 and exteriorly is connected to a source of washing liquid such as water (not shown). The end of pipe 26 within vessel 10 is sealed, and a plurality of openings are provided on the lower side of pipe 26 to cause even distribution of the washing liquid over packed bed 28. Thus, for example, the openings in pipe 26 might cause the liquid to pass from the pipe in a spray, preferably in sprays such as full-cone sprays 30. The gas passing through barrier 23 and containing entrained liquid likewise encounters packed bed 28 and passes therethrough cocurrently with the liquid from sprays 30.

Bed 28 is packed with a material having a substantially non-adhering surface and a high free volume. The surface renewal provided by such a packing results in removal of the fluorides or other foreign materials to levels in excess of 99.9%. While numerous materilas might be satisfactory as packing, bed 28 could be packed, for example, with packing material of the type disclosed in United States Patent No. 2,867,425, issued Jan. 6, 1959. Covered opening 32 provides access to bed 28 for the insertion and removal of packing.

Over 80% of the fluorides have been removed from the liquid leaving vessel 10 at outlet 24. Consequently, even though the packing within bed 28 has a complicated geometry to achieve the surface renewal, the small quantity of solids deposition, the nonadhering surface of the packing, the high free volume within bed 28, and the cocurrent flow of the gas and liquid inhibit the buildup of solids within the system.

Liquid passing out of bed 28 falls to the bottom of vessel 10 and leaves through lower outlet 34. As with the liquid from outlet pipes 24, this liquid can be recycled, treated, or discharged. The gas passing from bed 28 leaves vessel 10 through gas outlet 36 which preferably includes a vertical packed bed 38 to further remove any liquid entrained in the gas. Consequently, the gas leaves vessel 10 in an essentially fluoride free condition.

Although the present invention has been described with reference to a preferred embodiment, numerous modifications and changes can be made and still be within the scope of the invention.

What is claimed is:

1. Apparatus for effecting recovery of foreign values from a carrier gas comprising:
   (a) an elongated vertical cylindrical vessel defining a recovery zone;
   (b) means for tangentially introducing a mixture of carrier gas and foreign values into said vessel near the top of said recovery zone;
   (c) means for radially spraying a first washing liquid into said recovery zone to wash foreign values from the mixture;
   (d) means for separating at least a portion of the first washing liquid and washed foreign values from the carrier gas and discharging the separated liquid and washed foreign values from said apparatus;
   (e) a bed of packing material positioned for passage therethrough of carrier gas from said separating means, said packing material having a substantially non-adhering surface;
   (f) means for distributing a second washing liquid on said bed for passage therethrough cocurrently with the carrier gas to further remove foreign values from the carrier gas;
   (g) first outlet means for discharge of liquid and foreign values from said apparatus; and
   (h) second outlet means for discharge of carrier gas from said apparatus.

2. Apparatus as claimed in claim 1 in which said separating means separates a major portion of the first washing liquid and washed foreign values from the carrier gas.

3. Apparatus as claimed in claim 1 further comprising means within said recovery zone to inhibit vortex flow within said recovery zone.

4. Apparatus as claimed in claim 3 in which said second outlet means includes a second bed of packing material for removal of entrained liquid from the carrier gas.

5. Apparatus as claimed in claim 4 in which said distributing means comprises an elongated pipe adapted for connection to a source of washing liquid and extending horizontally above said bed and having in its lower surface a plurality of openings to distribute washing liquid onto said bed substantially evenly.

6. A process of recovering foreign material from carrier gas comprising:
   (a) introducing a mixture of carrier gas containing foreign values tangentially into a cylindrical recovery zone;
   (b) contacting the mixture with a radially directed spray of a first washing liquid within said recovery zone to remove foreign values from the mixture;
   (c) separating at least a portion of the first washing liquid and washed foreign values from the carrier gas;
   (d) discharging the separated liquid and washed foreign values from the recovery zone;
   (e) cocurrently passing a second washing liquid and the separated carrier gas through a bed packed with a material having a substantially nonadhering surface to further remove foreign values from the carrier gas;
   (f) discharging liquid and foreign values from the recovery zone through a first outlet; and (g) discharging carrier gas from the recovery zone through a second outlet.

7. A process as claimed in claim 6 further comprising passing the carrier gas through a second bed packed with a material having a substantially nonadhering surface prior to discharging said carrier gas from the recovery zone to remove entrained liquid from said carrier gas.

8. A process as claimed in claim 6 in which said foreign values include a fluoride compound and in which said washing liquid is water.

9. A process as claimed in claim 6 in which said first washing liquid removes foreign values by absorption.

References Cited

UNITED STATES PATENTS

| | | | |
|---|---|---|---|
| 3,348,825 | 10/1967 | McIlvaine | 261—98 |
| 3,406,953 | 10/1968 | Moore | 261—94 |

HARRY B. THORNTON, Primary Examiner

S. H. MARKOWITZ, Assistant Examiner

U.S. Cl. X.R.

55—71, 84, 238, 257; 261—79.1, 95